United States Patent
Arai et al.

(10) Patent No.: US 6,904,825 B2
(45) Date of Patent: Jun. 14, 2005

(54) SHIFT CONTROL DEVICE FOR A TRANSMISSION MECHANISM

(75) Inventors: Yoshimitsu Arai, Tokyo (JP); Noritosi Hasumi, Tokyo (JP); Nobuhiro Uchijima, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/348,741

(22) Filed: Jan. 22, 2003

(65) Prior Publication Data

US 2003/0106389 A1 Jun. 12, 2003

Related U.S. Application Data

(62) Division of application No. 09/413,877, filed on Oct. 7, 1999, now Pat. No. 6,532,842.

(30) Foreign Application Priority Data

Oct. 7, 1998 (JP) ........................................ P. 10-301605

(51) Int. Cl.[7] .............................................. B60K 20/00
(52) U.S. Cl. ................... 74/473.32; 74/473.1; 74/473.3
(58) Field of Search .......................... 74/473.3, 473.31, 74/473.32, 473.1

(56) References Cited

U.S. PATENT DOCUMENTS

| | | | | |
|---|---|---|---|---|
| 1,434,993 A | * | 11/1922 | Dunn ......................... | 74/473.3 |
| 1,906,262 A | * | 5/1933 | Hadley et al. ............. | 74/473.3 |
| 2,168,592 A | * | 8/1939 | Vanderveld ................ | 74/473.3 |
| 2,169,034 A | * | 8/1939 | Vanderveld ................ | 74/473.3 |
| 2,188,403 A | * | 1/1940 | Frisby ......................... | 74/370 |
| 2,198,681 A | | 4/1940 | Slack | |
| 3,264,895 A | * | 8/1966 | Turunen .................... | 74/473.3 |
| 3,540,313 A | | 11/1970 | Lavarec et al. | |
| 3,575,062 A | * | 4/1971 | Kitzner et al. ............ | 74/484 R |
| 3,648,828 A | | 3/1972 | Milton | |
| 4,762,015 A | | 8/1988 | Katayama | |
| 4,936,431 A | | 6/1990 | Shinpo | |
| 5,099,720 A | | 3/1992 | Raue | |
| 5,289,732 A | * | 3/1994 | Snell ........................ | 74/473.31 |

FOREIGN PATENT DOCUMENTS

JP          5-196117          8/1993

OTHER PUBLICATIONS

European Search Report, dated Feb. 10, 2000, for European Patent Application No. 99119175.0. pp. 1–3.

* cited by examiner

*Primary Examiner*—David A. Bucci
*Assistant Examiner*—Colby Hansen
(74) *Attorney, Agent, or Firm*—Smith, Gambrell & Russell, LLP

(57) ABSTRACT

A shift control device for a transmission mechanism for a motor vehicle having a shift control lever 2 provided in the vicinity of a steering wheel 1 for column shifting, a steering shaft 16 movable in response to the operation of the steering wheel 1, and a shift shaft 22 rotatable when the shift control lever 2 is operated in a first direction d2 and axially movable when the shift control lever 2 is operated in a second direction which is different from the first direction, wherein an axial direction S2 of the shift shaft 22 is different from an axial direction S1 of the steering shaft 16. Accordingly, it is possible to provide a transmission mechanism shift control device for preventing the occurrence of a gear shift that the driver does not intend and improving further the operability thereof.

20 Claims, 9 Drawing Sheets

SHIFT CONTROL DEVICE FOR A TRANSMISSION MECHANISM

This application is a divisional of U.S. application Ser. No. 09/413,877 filed Oct. 7, 1999, which became U.S. Pat. No. 6,532,842 on Mar. 18, 2003.

BACKGROUND OF THE INVENTION

1. Field of the Invention

The present invention relates to a shift control device for a transmission mechanism of a motor vehicle, and more particularly to a column-type shift control device.

2. Related Art

A column-type shift control device is now used on a part of motor vehicles equipped with an automatic transmission (AT) or a continuously variable transmission (CVT). In this shift control device, a shift control lever provided in the vicinity of a steering wheel is swung about a lever mounting axis or pulled up to thereby set a desired shift range. When compared with a floor-type shift control device, the column-type shift control device can help expand the effective space within a passenger compartment of a motor vehicle and improve the occupying properties thereof, much attention being thus paid to the latter.

FIG. 14 is a drawing explaining a conventional column-type shift control device. In the figure, reference numerals 1 and 2 denote a steering wheel and a shift control lever for column shifting, respectively. The steering wheel 1 is mounted on a steering shaft not shown, and the shift control lever 2 is mounted on a shift shaft not shown. The conventional shift control device is mounted such that an axis S1 of the steering shaft is parallel with an axis of the shift shaft. Therefore, when the shift control lever 2 is swung (moved in a direction indicated by reference numeral d1), the shift shaft rotates through an angle corresponding to a distance that the shift control lever is shifted. On the contrary, when the shift control lever 2 is pulled up toward the driver (moved in a direction indicated by reference numeral d2), the shift shaft moves in the axial direction thereof a distance corresponding to a distance that the shift control lever is shifted. In other words, these mean that the shift control lever 2 has to be moved in the direction d2 in order to move the shift shaft in the axial direction without rotating the same shaft, while the shift control lever 2 has to be moved in the direction d1 in order to move the shift shaft axially without rotating the same shaft.

In the shift control device in which the shift shaft is disposed in parallel with the steering shaft as described above, when swing operating the shift control lever 2 to try to shift the transmissions, the driver tends to move the same lever in a direction indicated by reference numeral d1' which deviates from the direction d1. In addition, when pulling up the shift control lever 2, the driver tends to move the same lever in a direction indicated by reference numeral d2' which deviates the direction d2. The reason for these deviations from the intended operating directions is because the driver tends to operate the shift control lever 2 with reference to a rotational center P of his or her shoulder. When thinking of swing operations by the driver, the driver tends to rotate the shift control lever 2 at a distance equal to a distance from the rotational center P of his or her shoulder to the shift control lever 2. In other words, the driver tends to swing the shift control lever while pulling it up by a distance equal to a deviation between the direction d1' and the intended direction d1. If a distance the shift control lever 2 is pulled up due to the aforesaid lever operation exceeds a predetermined pull-up distance which regulates lever shifting between two gear positions, an unintended gear position (for instance, a parking gear position) is engaged irrespective of a driver's intention to engage a currently intended gear position (for instance, a drive range position).

Next, a pull-up operation of the shift control lever 2 will be considered with reference to a case where the gears are shifted from the parking position to any of the other gear positions. This gear shifting needs a lever operation in which the shift control lever 2 which is being located at the parking position is pulled up a predetermined distance in the direction d2 before it is swung. In this pull-up operation, the shift control lever 2 can be shifted in the direction d2, but the lever is restricted from being shifted in the direction d1 by the mechanism of this shift control device. Since the driver tends to pull up the shift control lever in a direction toward the rotational center P of his or her shoulder (move the shift control lever in the direction d2'), the shift control lever 2 tends to be shifted toward the direction d2'. In other words, the driver tends to pull up the shift control lever 2 while applying thereto a force in a direction deviating from the intended direction d2 toward the direction d1'. However, since the movement in the direction d1' is restricted, the shift control lever 2 is shifted in the direction d2 which is different from the driver's intended direction d2'. As a result of this, there may be a risk of the driver eventually feeling an unnatural shift lever operation feeling.

SUMMARY OF THE INVENTION

In view of the problem inherent in the prior art, it is an object of the present invention to provide a shift control device for a transmission mechanism for a motor vehicle which can prevent the occurrence of a gear shift which the driver does not intend to have.

It is another object of the present invention to improve the operability of the shift control device that will be so provided.

With a view to solving the aforesaid problem, a first aspect of the present invention provides a shift control device for a transmission mechanism for a motor vehicle in which gear shifting is performed by a shift control lever provided in the vicinity of a steering wheel for column shifting, comprising:

a guide member movable in a first direction by swing operating the shift control lever and in a second direction different from the first direction by pull-up operating the shift control lever; and a regulating member having a plurality of steps for regulating the movement of the guide member in said first direction, whereby the operating distance to pull up the shift control lever is regulated by heights of the plurality of steps, respectively; wherein the heights of said plurality of steps for regulating the operating distance to pull up the shift control lever at the time of gear shifting accompanied by a pull-up operation of the shift control lever are greater than a travelling distance of the guide member in the second direction when the shift control lever is caused to travel from a position before the gear shifting to a position thereafter with a distance between a position of the shift control lever before the gear shifting and a shoulder point of the driver at his or her own driving position being maintained substantially constant.

A second aspect of the present invention provides a shift control device for a transmission mechanism for a motor vehicle in which gear shifting is performed by a shift control lever provided in the vicinity of a steering wheel for column shifting, comprising:

a shift shaft movable in response to operation of the shift control lever; a guide member movable in a first direction by swing operating the shift control lever and in a second direction different from the first direction by pull-up operating the shift control lever; and a regulating member having a slidable portion for regulating a direction in which the shift control lever is pulled up through abutment with the guide member; wherein a first angle forming an acute angle by a travelling direction of the guide member in which the guide member travels while kept in abutment with the slidable member through the pull-up operation of the shift control lever and a reference line is smaller than a second angle forming an acute angle by an axial direction of the shift shaft and the reference line, and wherein; the reference line is a line connecting the position of the shift control lever and the shoulder point of the driver at his or her own driving position.

A third aspect of the present invention provides a shift control device for a transmission mechanism for a motor vehicle in which gear shifting is performed by a shift control lever provided in the vicinity of a steering wheel for column shifting, having a guide member movable in a first direction by swing operating the shift control lever and in a second direction different from the first direction by pull-up operating the shift control lever; and a regulating member having a slidable portion for regulating a direction in which the shift control lever is pulled up through abutment with the guide member; and wherein a travelling path of the guide member along which the guide member travels while kept in abutment with the slidable member through the pull-up operation of the shift control lever is substantially parallel with a reference line which connects the position of the shift control lever and the shoulder point of the driver at his or her own driving position.

A fourth aspect of the present invention provides a shift control device for a transmission mechanism for a motor vehicle in which gear shifting is performed by a shift control lever provided in the vicinity of a steering wheel for column shifting, having: a shift shaft movable in response to operation of the shift control lever; a guide member movable in a first direction by swing operating the shift control lever and in a second direction different from the first direction by pull-up operating the shift control lever; and a regulating member having a plurality of steps for regulating the movement of the guide member in the first direction, whereby the operating distance to pull up the shift control lever is regulated by heights of the plurality of steps, respectively and a slidable portion for regulating a direction in which the shift control lever is pulled up through abutment with the guide member; wherein the heights of the plurality of steps for regulating the operating distance to pull up the shift control lever at the time of gear shifting accompanied by a pull-up operation of the shift control lever are greater than a travelling distance of the guide member in the second direction when the shift control lever is caused to travel from a position before the gear shifting to a position thereafter with a distance between a position of the shift control lever before the gear shifting and a shoulder point of the driver at his or her own driving position being maintained substantially constant; and wherein a first angle forming an acute angle by a travelling direction of the guide member in which the guide member travels while kept in abutment with the slidable member through the pull-up operation of the shift control lever and a reference line which connects the position of the shift control lever and the shoulder point of the driver at his or her own driving position is smaller than a second angle forming an acute angle by an axial direction of the shift shaft and the reference line.

In the above constructions, it is desirable that the guide member is a guide pin having a substantially circular cross section and that the heights of the plurality of steps are greater than a sum of a travelling distance of the guide member in the second direction when the shift control lever is caused to travel from a position before the gear shifting to a position thereafter with a distance between a position of the shift control lever before the gear shifting and a shoulder point of the driver at his or her own driving position being maintained substantially constant and the radius of the guide pin.

In addition, the regulating member may be a guide plate formed on a concentric circle about a center of the shift shaft.

Furthermore, the guide member may be a detent pawl, and the regulating member may be a detention body.

A fifth aspect of the present invention provides a shift control device for a transmission mechanism for a motor vehicle in which gear shifting is performed by a shift control lever provided in the vicinity of a steering wheel for column shifting, comprising:

a steering shaft movable in response to operation of the steering wheel; a shift shaft rotatable when the shift control lever is operated in a first direction and movable in an axial direction when the shift control lever is operated in a second direction which is different from the first direction, wherein an axial direction of the shift shaft and an axial direction of the steering shaft are different from each other.

A sixth aspect of the present invention provides a shift control device for a transmission mechanism for a motor vehicle in which gear shifting is performed by a shift control lever provided in the vicinity of a steering wheel for column shifting, comprising:

a steering shaft movable in response to operation of the steering wheel; and a shift shaft rotatable when the shift control lever is operated in a first direction and movable in an axial direction when the shift control lever is operated in a second direction which is different from the first direction, wherein; a first angle forming an acute angle by an axial direction of the shift shaft and a horizontal line is smaller than a second angle forming an acute angle by an axial direction of the shift shaft and the horizontal line.

A seventh aspect of the present invention provides a shift control device for a transmission mechanism for a motor vehicle, comprising:

a steering wheel; a shift control lever provided in the vicinity of the steering wheel for column shifting; and a shift shaft rotatable when the shift control lever is operated in a first direction and movable in an axial direction when the shift control lever is operated in a second direction which is different from the first direction, wherein; a line connecting the shift control lever and a shoulder point of the driver at his or her own driving position is substantially parallel with the axial direction of said shift shaft.

A eighth aspect of the present invention provides a shift control device for a transmission mechanism for a motor vehicle, comprising:

a steering wheel; a shift shaft rotatable and movable in an axial direction thereof; and a shift control lever for column shifting provided in the vicinity of the steering wheel, kept in engagement with the shift shaft, and adapted to rotate the shift shaft when moved in a first direction and move the shift shaft in the axial direction when moved in a second direction which is different from the first direction; wherein a first angle forming an acute angle by the first direction of the shift control lever and a vertical line is smaller than a second line forming a smallest acute angle by a straight line on a plane of the steering wheel and the horizontal line.

A ninth aspect of the present invention provides a shift control device for a transmission mechanism for a motor vehicle, comprising:

a steering wheel; a steering shaft movable in response to operation of the steering wheel; a shift shaft rotatable and movable in an axial direction thereof; and a shift control lever for column shifting provided in the vicinity of the steering wheel, kept in engagement with the shift shaft, and adapted to rotate the shift shaft when moved in a first direction and move the shift shaft in the axial direction when moved in a second direction which is different from the first direction; wherein a first angle forming an acute angle by said second direction of the shift control lever and a horizontal line is smaller than a second angle forming an acute angle by the axial direction of the steering shaft and the horizontal line.

In a shift control device for a transmission mechanism for a motor vehicle as set forth in the above fifth to ninth aspects, there may be provided a guide member movable in a third direction by swing operating said shift control lever and in a fourth direction different from said third direction by pull-up operating said shift control lever and a regulating member having a plurality of steps for regulating the movement of the guide member in said third direction, whereby the operating distance to pull up the shift control lever is regulated by heights of the plurality of steps, respectively. In this case, the heights of the plurality of steps for regulating the operating distance to pull up the shift control lever at the time of gear shifting accompanied by a pull-up operation of the shift control lever are greater than a travelling distance of the guide member in the second direction when the shift control lever is caused to travel from a position before the gear shifting to a position thereafter with a distance between a position of the shift control lever before the gear shifting and a shoulder point of the driver at his or her own driving position being maintained substantially constant.

In a shift control device for a transmission mechanism for a motor vehicle as set forth in the above fifth to ninth aspects, there may be provided a guide member movable in a third direction by swing operating the shift control lever and in a fourth direction different from the third direction by pull-up operating said shift control lever; and a regulating member having a slidable portion for regulating a direction in which the shift control lever is pulled up through abutment with the guide member. In this case, a first angle forming an acute angle by a travelling direction of the guide member in which the guide member travels while kept in abutment with the slidable member through the pull-up operation of the shift control lever and a reference line which connects the position of the shift control lever and the shoulder point of the driver at his or her own driving position is smaller than a second angle forming an acute angle by an axial direction of the shift shaft and the reference line.

In a shift control device for a transmission mechanism for a motor vehicle as set forth in the above fifth to ninth aspects, there may be provided a guide member movable in a third direction by swing operating the shift control lever and in a fourth direction different from the third direction by pull-up operating the shift control lever, and a regulating member having a slidable portion for regulating a direction in which the shift control lever is pulled up through abutment with the guide member. In this case, a travelling path of the guide member along which the guide member travels while kept in abutment with the slidable member through the pull-up operation of the shift control lever is substantially parallel with a reference line which connects the position of the shift control lever and the shoulder point of the driver at his or her own driving position.

In a shift control device for a transmission mechanism for a motor vehicle as set forth in the fifth to ninth aspects, there may be provided a guide member movable in a third direction by swing operating the shift control lever and in a fourth direction different from the third direction by pull-up operating the shift control lever and a regulating member having a plurality of steps for regulating the movement of the guide member in the third direction, whereby the operating distance to pull up the shift control lever is regulated by heights of the plurality of steps, respectively and a slidable portion for regulating a direction in which the shift control lever is pulled up through abutment with the guide member. In this case, the heights of the plurality of steps for regulating the operating distance to pull up the shift control lever at the time of gear shifting accompanied by a pull-up operation of the shift control lever are greater than a travelling distance of the guide member in the second direction when the shift control lever is caused to travel from a position before the gear shifting to a position thereafter with a distance between a position of the shift control lever before the gear shifting and a shoulder point of the driver at his or her own driving position being maintained substantially constant and a first angle forming an acute angle by a travelling direction of the guide member in which the guide member travels while kept in abutment with the slidable member through the pull-up operation of the shift control lever and a reference line which connects the position of thed shift control lever and the shoulder point of the driver at his or her own driving position is smaller than a second angle forming an acute angle by an axial direction of the shift shaft and said reference line.

The present disclosure relates to subject matter contained in Japanese Patent Application No. Hei. 10-301605, filed on Oct. 7, 1998, and which is expressly incorporated herein by reference in its entirety.

DETAILED DESCRIPTION OF THE PREFERRED EMBODIMENTS

Figure 1:
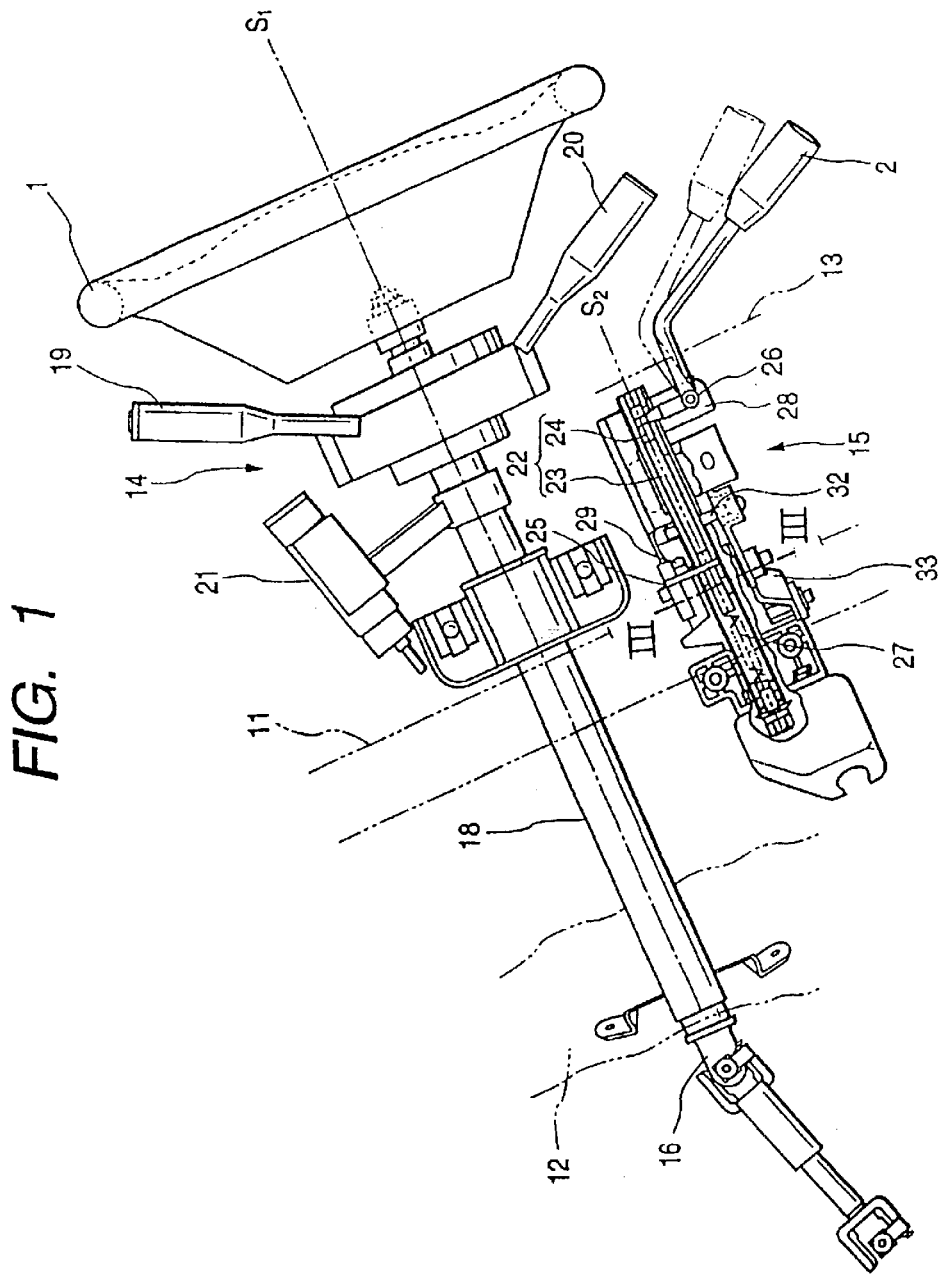
FIG. 1 is a schematic plan view showing an example of a steering device and a transmission mechanism shift control device.
Figure 2:
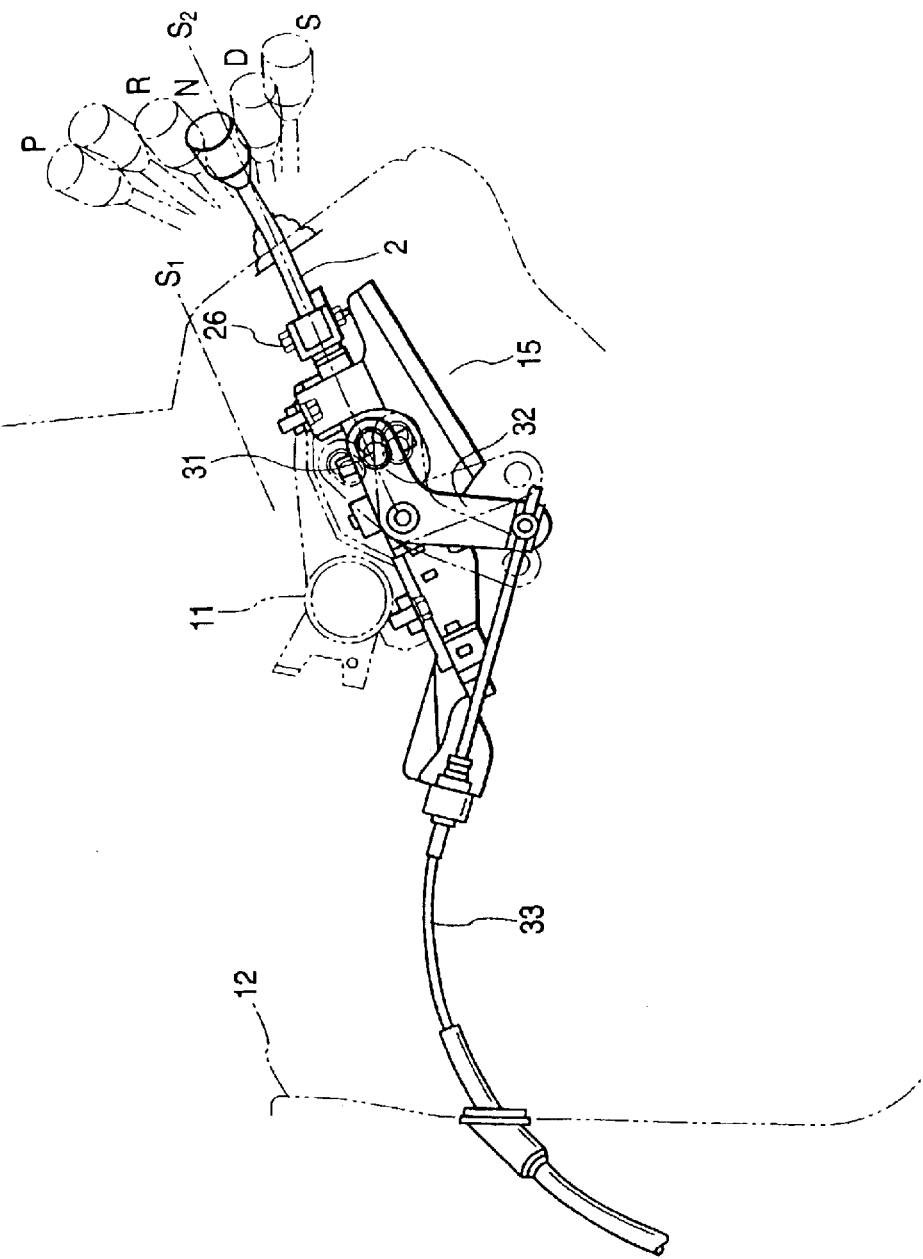
FIG. 2 is a side view showing a main part of the transmission mechanism shift control device shown in FIG. 1.

FIG. 1 is a schematic plan view showing a steering device and an example of a shift control device for a transmission mechanism, and FIG. 2 is a side view of a main part of the shift control device for a transmission mechanism shown in FIG. 1. In the figures, reference numerals 11, 12 and 13 denote a steering support beam, a toe board and an instrument panel, respectively. A steering device 14 is provided and supported on the steering support beam 11 and the toe board 12. A transmission shift control device 15 is disposed at a position close to the steering device 14 and mounted on the steering support beam 11.

In the steering device 14, a steering shaft 16 penetrates the toe board 12 to be connected at one end thereof to a steering gear box not shown and has a steering wheel 1 mounted on the other end thereof. The steering shaft 16 is graspingly held by a steering column mounted on the steering support beam 11 and the toe board 12, and rotates in accordance with a distance the steering wheel 1 is operated. Mounted on the steering column 18 are various controls such as a direction indicator control lever 19, a windshield wiper control lever 30, and an ignition key 21.

A shift shaft 22 is disposed in the transmission shift control device 15 in such a manner that an axis S2 thereof becomes substantially parallel with an axis S1 of the steering shaft 16. The shift shaft 22 comprises a rotatable tubular outer shaft 23 and a post-like inner shaft 24 which is fittingly inserted into the outer shaft 23 in such a manner as to move in an axial direction and rotate therein. Insertion holes are formed in one side of the outer shaft 23 and inner shaft 24, respectively, and a guide pin 25 having a substantially circular cross-section is inserted from the insertion hole of the outer shaft 23, penetrates the insertion hole of the inner shaft 24 and reaches the outer shaft 23. In addition, a spring 27 is provided on the one side of the inner shaft 24, so that the inner shaft 24 is biassed toward the other side thereof at all times. On the other hand, a projection 28 is provided on the other side of the outer shaft 23 for supporting a shift control lever 2 (so called as a selector lever) for column shifting and an insertion hole is also formed in the same side of the outer shaft 23 for a distal end portion of the shift control lever 2 to be inserted thereinto. The inner shaft 24 is brought into engagement with the distal end portion of the shift control lever 2 for column shifting at one end on the other side thereof. The shift control lever 2 protruding into a passenger compartment through the instrument panel 13 is supported on a rotating shaft 26 provided on the projection 28 in such a manner as to rotate thereon, whereby an operation of the shift control lever 2 is converted into a movement of the shift shaft 22.

When the shift control lever 2 is shifted about the axis S2 (the position of the shift control lever 2 is shifted to a position shown in FIG. 2), the outer shaft 23 rotates about the axis S2, and the inner shaft 24 also rotates via the guide pin 25. On the contrary, when the shift control lever 2 is pulled up (the position of the shift control lever 2 is shifted to a position shown in FIG. 1), the shift control lever 2 swings about the rotating shaft 26. This causes the distal end portion of the shift control lever 2 to push the inner shaft 24 along the axis S2 against the spring force applied by the spring 27. When the shift control lever 2 is released from the pulled-up state, the inner shaft 24 operates so as to be restored toward the distal end portion side of the shift control lever 2 by virtue of the spring or biassing force of the spring 27.

A detent plate 31 operates interlockingly with the outer shaft 23, and a distal end portion thereof engages one end of a shift arm 32. The L-shaped shift arm 32 is mounted on a shift arm support shaft in such a manner as to rotate about the same shaft, and formed on the other end thereof is a support portion of a select cable 33. When the outer shaft 23 rotates, the distal end portion of the detent plate 31 swings, and the shift arm 32 engaged with the distal end portion of the detent plate 31 swings in turn. A displacement of the shift arm 32 like this is then transmitted to a change-speed control device not shown via the select cable 33, whereby the transmission control-device performs a desired gear shift.

Figure 3:
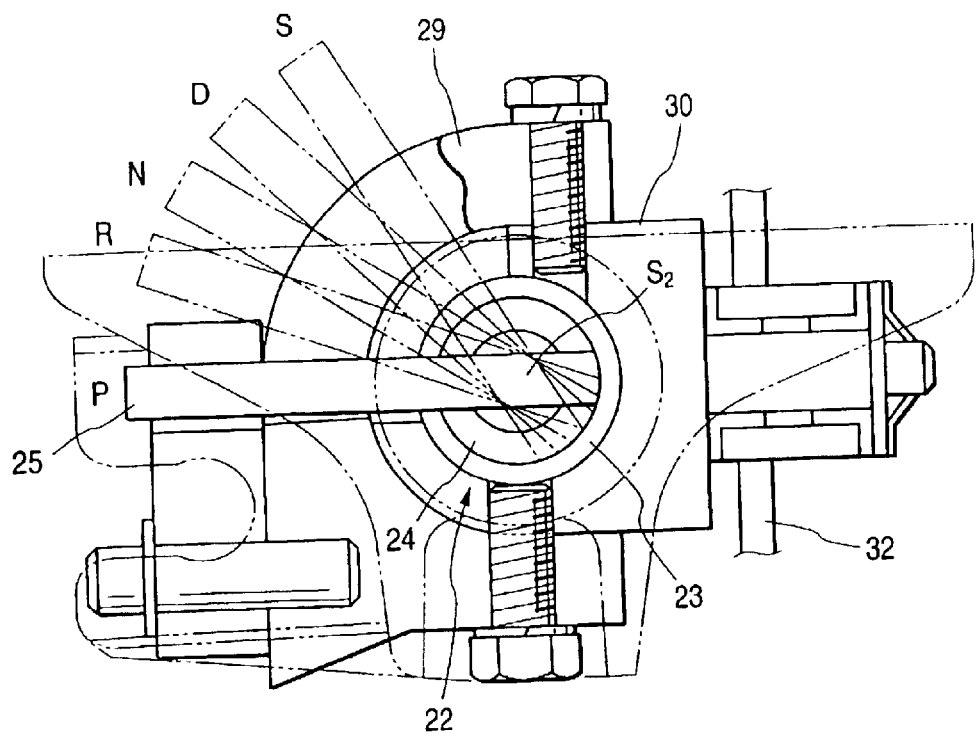
FIG. 3 is a sectional view taken along the line C–C' of the transmission mechanism shift control device shown in FIG. 1.
Figure 4:
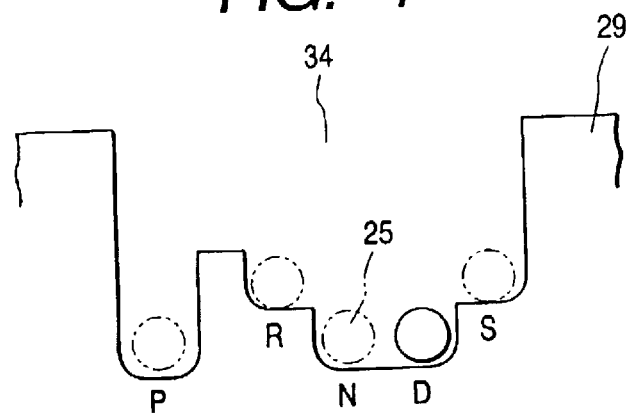
FIG. 4 is an unfolded view of a main part of a guide plate.

A guide plate 29 is provided in the vicinity of the guide pin 25 for regulating a shiftable range for the shift control lever 2 in conjunction with the guide pin 25. The guide plate 29 is a flat plate having a predetermined thickness and formed into an arc-like or C-shaped configuration. FIG. 3 is a sectional view taken along the line C–C' of the transmission mechanism shift control device shown in FIG. 1. As is clear from this view, the guide plate 29 is attached with a bolt or the like to an outer circumference of a holder portion 30 on a concentric circle about the center of the shift shaft 22. In addition, FIG. 4 is a plan view of an unfolded main part of the guide plate.

This guide plate 29 has an opening 34 and the configuration of the opening 34 regulates a shiftable range for the guide pin 25 (in other words, a shiftable range for the shift control lever 2). In FIG. 4, reference character P denotes a position the guide pin 25 at a parking position (hereinafter, referred to as P position). In addition, reference characters R, N, D and S denote positions of the guide pin 25 at a reverse position (R position), a neutral position (N position), a drive position (D position), and a sport position (S position), respectively. Steps are provided between the shift positions except for between the D–N positions. These steps regulate operating distances that the shift control lever 2 is pulled up for the respective gear shifts. Here, assume that the gears are shifted from N position to D position. In this case, when the shift control lever 2 is shifted toward a lower side thereof, the guide pin 25 swings the shift shaft 22 about the axis S2. This means that in FIG. 3 the guide in 25 is shifted clockwise about the axis S2 of the shift shaft 22, and that in FIG. 4, the guide pin 25 is shifted rightward. When the guide pin 25 is brought into abutment with the step between D–S positions, the guide pin 25 can move rightward no farther than the step, whereby the shift of the shift control lever 2 is regulated.

Next, a gear shift from N to R positions will be considered in which the shift control lever 2 needs to be pulled up. If the shift control lever 2 is tried to be shifted to an upper side without being pulled up or if it is not sufficiently pulled up, the guide pin 25 is restricted from being shifted leftward by the step between N–R positions, as shown in FIG. 4. However, the guide pin 25 positioned at R position starts to move toward the upper side when the shift control lever 2 is sufficiently pulled up, as shown in FIG. 4, and when the lever is pulled up higher than the height of the step between N–R positions, the guide pin 25 is permitted to be shifted leftward. In other words, when the shift control lever 2 is swung upwardly after it is pulled up sufficiently, the guide pin 25 is released from the restricted movement by the step between N–R positions as shown in FIG. 4, and as a result of this, as shown in FIG. 3, the guide pin 25 rotates counterclockwise about the axis S2 from N to R positions. When it comes to abutment with the step between R–P positions as shown in FIG. 4, the guide pin 25 is not permitted to move leftward any farther, and therefore the shift control lever 2 is restricted from swinging. When shifted from N to R positions, since there is a need to pass over no step, the shift control lever 2 does not have to be pulled up. When shifted from N to R positions, from R to P positions, and from P to R positions, the guide pin 25 needs to be pulled up higher than the height of the steps between the respective positions, as so it does when shifted from N to R positions.

(First Embodiment)

Figure 5:
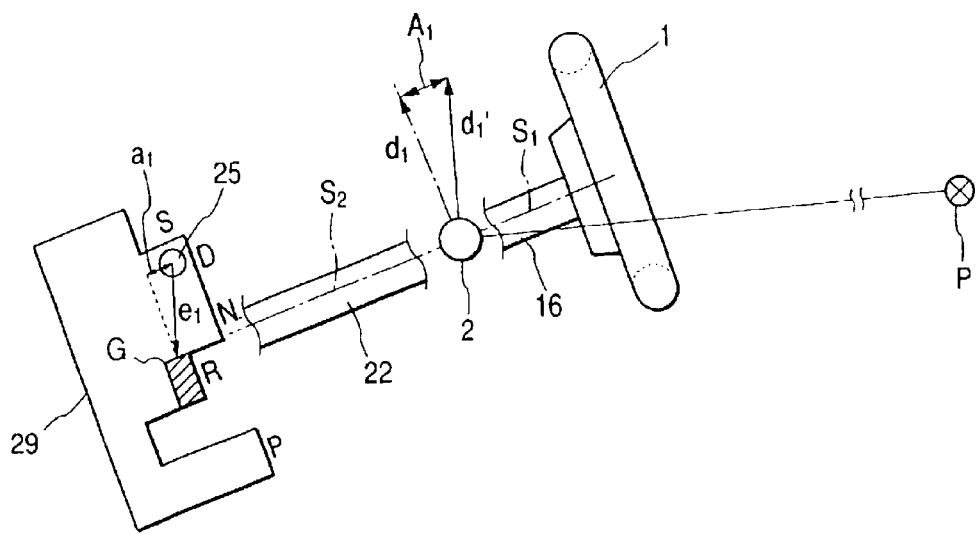
FIG. 5 is a schematic diagram for explaining a first embodiment.

FIG. 5 is a schematic diagram for explanation of a first embodiment. In this diagram, it should be noted that the shift control lever 2 extends toward the viewer of the diagram, that the guide pin 25 extends toward the back side of the diagram and that the guide plate 29 is provided on the back side of the diagram. When shifted from D position to N position, the shift control lever starts to move from D position toward the upper side. When that happens, the driver tends to operate the shift control lever 2 on a concentric circle about the rotational center of his or her shoulder. It is a most natural movement to the driver to operate the shift control lever 2 by virtue of the rotation of the shoulder without bending the arm. Here, the rotational center of the shoulder of the driver of a "standard build" at his or her driving position is defined as a "shoulder point" P. In the case of the Japanese, a dummy (JM50) may be considered as the "standard build." Of course, the builds and heights of people differ from country to country, the "shoulder point" may be set individually with reference to the standard build of the people of a country to which motor vehicles are exported. Thus, the shift control lever 2 tends to be operated on a concentric circle about the shoulder point P, in other words, with a distance between the shoulder point P and the position of the shift control lever 2 being maintained constant.

As shown in FIG. 5, in a case where directions of the axis S1 of the steering shaft 16 and the axis S2 of the shift shaft 22 coincide with each other, from the aforesaid driver's tendency to operate the shift control lever, the shift lever 2 located at D position is shifted with the distance from the shoulder point P being maintained constant (this shift operation being indicated by a vector d1'). Since the vector D1' deviates from an originally intended vector d1, in other words, a swinging direction of the shift control lever 2 without pulling it up, a pull-up operation is added which the driver never intends to do. A shift distance associated with this pull-up operation is indicated by reference character/numeral A1. The shift shaft 22 rotates while being shifted from the shift control lever 2 side toward the guide plate 29 due to the shift of the shift control lever 2 toward the upper side (vector d1') accompanying the pull-up operation. The guide pin 25 is shifted from D position in the guide plate 29 as shown by a vector e1 when the shift control lever 2 is shifted axially. An axial component of this vector e1 (i.e., an axial shift distance of the guide pin 25 corresponding to the shift distance A1 of the shift control lever 2) is denoted by reference character/numeral a1.

In a case where the axial shift distance a1 of the guide pin 25 exceeds the height of the step between N–R positions, the guide pin 25 is engaged in R position without abutment with the step. To prevent the generation of a malfunction like this, the height of the step between N–R positions may be set in consideration of the driver's unintentional pull-up distance A1. In other words, the height of the step may be set higher than the shift distance in the axial direction S2 of the guide pin 25 which is shifted by the shift distance A1 of the shift control lever 2. In FIG. 5 a shaded step portion by diagonal lines is a portion additionally provided on the existing step portion to have a higher height from the aforesaid reason. In addition, a gear shift from D to R positions accompanied by a pull-up operation of the shift operation lever 2 can be completed by pulling up the shift control lever 2 a shift distance greater than the height of the step between N and R positions.

When the guide pin 25 having a substantially circular cross-section is used, it is desirable to set the height of the step between N–R positions greater than a sum of the shift distance a1 and the radius of the circular cross-section of the guide pin 25 (similar in the following embodiments, too). An erroneous gear shift can be prevented from occurring further effectively by increasing the height of the step by a height corresponding to the radius of the circular cross-section of the guide pin 25. Namely, if the height of the step is higher than the shift distance a1 but lower than the sum of the shift distance a1 and the radius of the guide pin, the center of the cross-section of the guide pin 25 becomes higher than the height of the step. As a result of this, there may be a risk that the guide pin sliding over a top portion G of the step with which it abuts to be shifted in R position. If the step is formed further higher by equal to or more than the radius of the guide pin 25, since there is no chance for the center of the cross-section of the guide pin 25 to become higher than the height of the step, the gear shift to R position can thus be prevented.

As is clear from the above description, in this embodiment, the steps in the guide plate 29 are set higher by taking into consideration the driver's operation tendency in operating the shift control lever 2 vertically. In other words, the step between N–R positions is formed higher than the shift distance of the guide pin 25 corresponding to the pull-up distance when the shift control lever 2 is operated vertically with the distance from the shoulder point P being maintained constant. This can effectively prevent the occurrence of an erroneous gear shift into R positions as a result of an unintentional pull-up operation of the shift control lever 2 when shifted from D position to N position.

(Second Embodiment)

Figure 6:
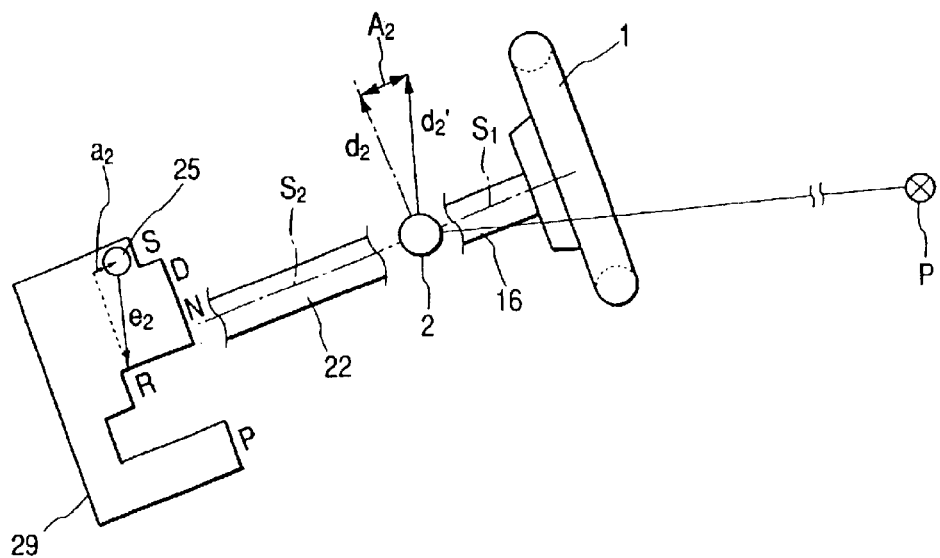
FIG. 6 is a schematic diagram for explaining a second embodiment.

FIG. 6 is a schematic diagram for explanation of a second embodiment. From the same reason as that explained in the description of the first embodiment, an erroneous gear shift into R position may occurr when shifted from S position to N position. A vector d2 in FIG. 6 denotes a direction and a shift distance that are originally intended when the shift control lever 2 is shifted from S position toward P position. On the other hand, a vector d2' denotes a direction and a shift distance when the shift control lever 2 is rotated with the distance from the shoulder point being maintained the same. Denoted by A2 is a shift distance, i.e., a pull-up distance generated in the direction of the axis S2 of the shift shaft 22 by virtue of a difference between those vectors d2, d2'. When the shift control lever 2 is operated as indicated by the vector d2', the guide pin 25 is shifted within the guide plate 29 as indicated by a vector e2.

Reference character/numeral a2 is a shift distance in the direction of the axis S2 when the guide pin 25 is shifted as indicated by the vector e2. When the height of the step between S–R positions (i.e., a difference in height between the step between N–R positions and the step between D–S positions) is equal to or lower than a shift distance a2, the guide pin 25 is shifted into R position. To cope with this, in this embodiment, the step between D–S positions is formed lower and the step between N–R positions is formed higher, or the step of the former is formed lower, and the step for the latter is formed higher, whereby it is effective to set the step between S–R positions higher than the shift distance a2. This can effectively prevent the occurrence of an erroneous gear shift into R position when shifted from S position to N position. In addition, when tried to be shifted from S position to R position accompanied by a pull-up operation of the shift control lever 2, the shift control lever 2 is pulled up an operation distance greater than the height of the step.

(Third Embodiment)

Figure 7:
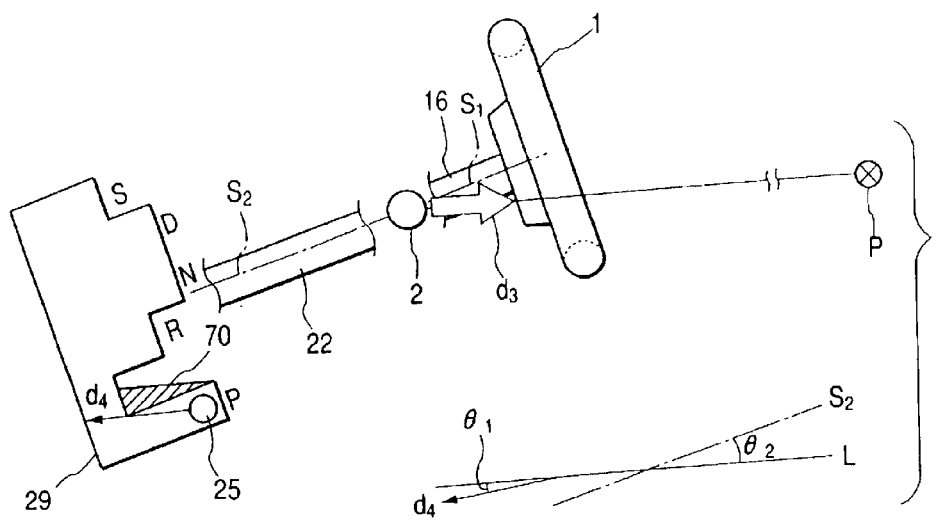
FIG. 7 is a schematic diagram for explaining a third embodiment.

The object of the first and second embodiments described above is to prevent an erroneous gear shift, while an object of third and fourth embodiments that will be described below is to improve the operability of the shift control lever 2. FIG. 7 is a schematic diagram for explaining the third embodiment. When shifted from P position to R position, the shift control lever 2 is operated to be shifted to a lower side after it is pulled up. To try to explain this through the movement of the guide pin 25, after it is shifted a shift distance greater than the height of the step between P–R positions in the direction S2 of the shift shaft 22, the guide pin 25 is shifted in a direction normal to the direction S2.

When he or she pulls it up, the driver tends to pull up the shift control lever 2 in a direction d3, in other words, in a direction from the shift control lever 2 toward the shoulder point P. Since the movement of the guide pin 25 is restricted by the configuration of the guide plate 29, however, the shift control lever 2 is permitted to be shifted only in the direction S2. Therefore, the shift control lever 2 has to be shifted in the direction of the axis S2 of the shift shaft. When this direction is looked at from the driver side, the shift control lever is pulled up in a direction slightly upwardly of the direction d3 which makes the driver feel the most natural pull-up feeling, and therefore the permitted pull-up direction may make the driver feel an unnatural lever operation feeling. In addition, if the edge portion of the guide plate 29 for regulating the movement of the guide pin 25 when it is pulled up is not formed smoothly and has some irregularities therealong, vibrations generated by such unsmoothness and irregularities may be transmitted to the shift control lever 2, thereby making the driver feel an uncomfortable feeling.

To cope with this, as shown in FIG. 7, a portion of the step between P–R positions which is shaded with diagonal lines is cut. Here, a direction of an edge portion of a sliding portion 70 which is newly formed by cutting the diagonally lined portion, or a direction of an edge portion along which the guide pin 25 is caused to slide while kept in abutment therewith is denoted by reference character/numeral de4. Then, an acute angle is referred to as angle $\theta1$ which is formed by the direction d4 of the edge portion (sliding direction) and a straight line L parallel with a straight line connecting the shift control lever 2 and the shoulder point P. On the other hand, an acute angle is referred to as angle $\theta2$ which is formed by the axis S2 of the shift shaft 22 and the straight line L. In this case, the step is configured such that the angle $\theta1$ with respect to the direction of the edge portion is smaller than the angle $\theta2$ with respect to the axis S2 of the shift shaft. From the viewpoint of the shift feeling, it is preferable that the angle $\theta1$ approximates as close to zero as possible, in other words, the sliding direction d4 and the straight line L are substantially parallel with each other.

By forming the step between P–R positions, if the driver tries to pull up the shift control lever in the direction d3, since the guide pin 25 is shifted as shown by the vector d4, the shift control lever 2 is shifted toward the direction d3. This prevents the driver from being caused to feel an unnaturally unsmooth feeling, thereby making it possible to improve further the lever shift feeling. In addition, since there is no chance for the guide pin 25 to be brought into a strong abutment with the sliding portion 70, vibrations arising from the irregularities along the sliding portion can be prevented from being transmitted to the driver.

(Fourth Embodiment)

Figure 8:
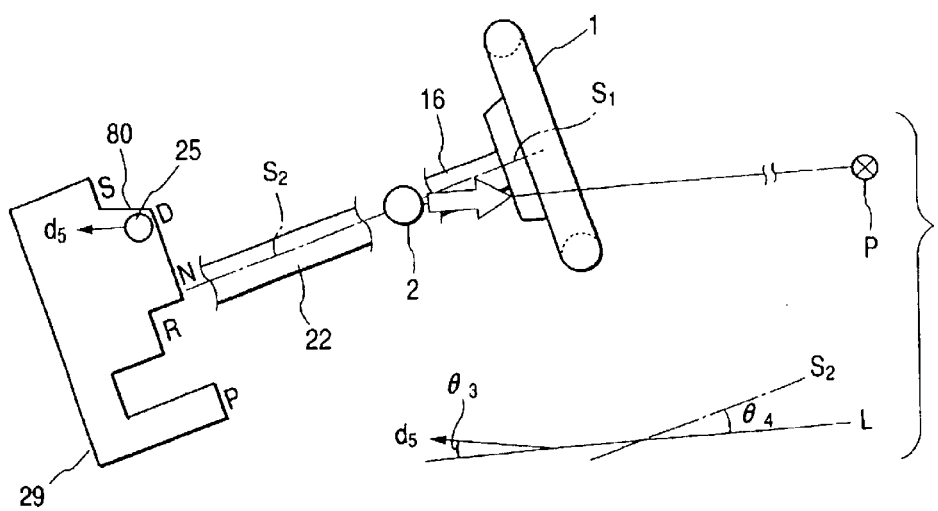
FIG. 8 is a schematic diagram for explaining a fourth embodiment.

FIG. 8 is a schematic diagram for explaining a fourth embodiment. From the same reason as that explained in the third embodiment, even when shifting gears from D to S positions, there is probability that the driver will be feel an unnatural shift feeling. To cope with this, as shown in FIG. 8, a part of the step between D–S positions in the guide plate 29 is cut diagonally. Here, indicated by reference character/numeral d5 is a direction of an edge portion of a sliding portion 80 where the guide pin 25 is shifted while kept in abutment therewith or a direction in which the guide pin 25 is shifted while kept in abutment the sliding portion 80. Then, an acute angle is referred to as angle $\theta3$ which is formed by the direction d4 of the edge portion (sliding direction) and a straight line L parallel with a straight line connecting the shift control lever 2 and the shoulder point P. On the other hand, an acute angle is referred to as angle $\theta4$ which is formed by the axis S2 of the shift shaft 22 and the straight line L. In this case, the step is configured such that the angle $\theta3$ with respect to the direction of the edge portion is smaller than the angle $\theta4$ with respect to the axis S2 of the shift shaft. As with the third embodiment, from the viewpoint of the shift feeling, it is preferable that the angle $\theta1$ approximates as close to zero as possible.

In addition, preferably, the above first to fourth embodiments are combined with one another, by which the shift feeling in the respective gear shifts can be improved and the occurrence of erroneous gear shifts can further be prevented.

Figure 9:
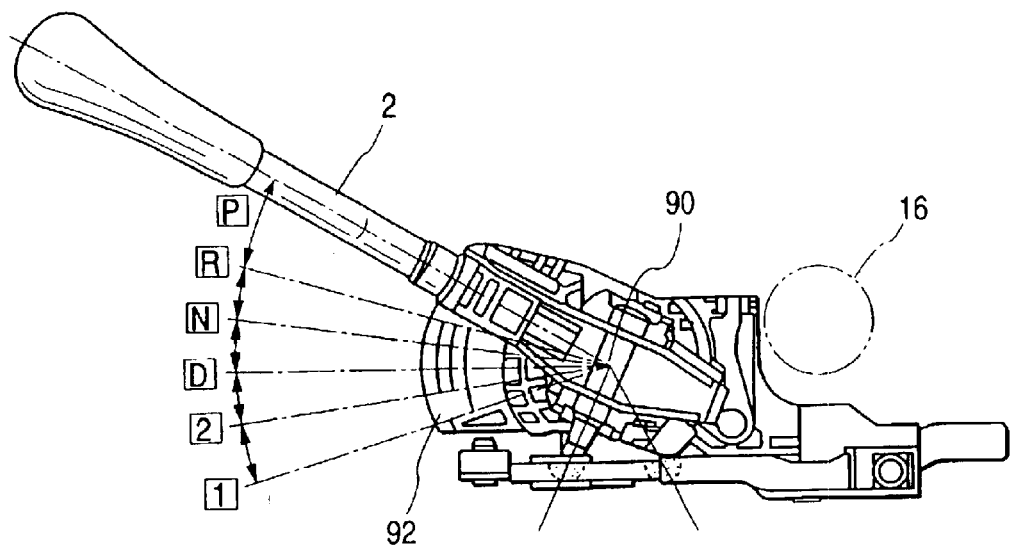
FIG. 9 is a schematic diagram showing a construction of another transmission mechanism shift control device.
Figure 10:
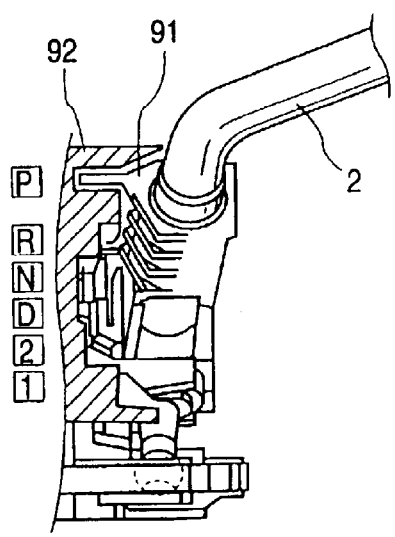
FIG. 10 is a diagram showing a main part of the transmission mechanism shift control device shown in FIG. 9.

Thus, in the above first to fourth embodiments, the shift control device for a transmission mechanism has been described in which the shift of the shift control lever is regulated by means of the guide pin and the guide plate. The present invention, however, is not limited to a shift control device constructed as described in those embodiments and it may be applied to a shift control device for a transmission mechanism which is constructed in another way. As examples of such a device, embodiments will be described below in which the present invention is applied to the transmission mechanism shift control devices shown in FIGS. 9 and 10.

(Fifth Embodiment)

A shift control lever mounting shaft 90 is provided in the vicinity of the steering shaft 16, and the shift control lever 2 is mounted on this mounting shaft 90. A detent pawl 91, which is a flat plate-like guide member, is integrally provided on the shift control lever. This detent pawl 91 regulates the shift of the shift control lever 2 in conjunction with a detention body 92. In other words, the detent pawl 91 mounted on the shift control lever 2 plays a role of the guide pin in the transmission mechanism shift control device shown in FIG. 1, and the detention body 92 as a role of the guide plate in the same device.

Figure 11:
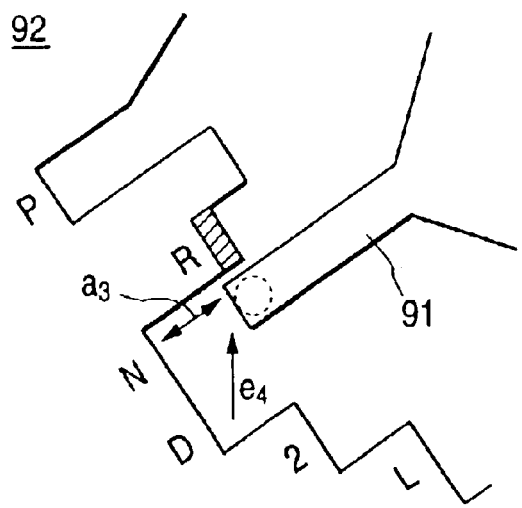
FIG. 11 is a schematic diagram for explaining a fifth embodiment.

FIG. 11 is a schematic diagram explaining the fifth embodiment. An object of this embodiment is to prevent an erroneous gear shift when gears are shifted from D position (or $2^{nd}$ position) to R position, and the embodiment can be a modification of the first and second embodiments. The shift control lever is swung with the distance from the shoulder point being maintained equal or constant. This allows the shift control lever 2 to be pulled up and the detent pawl 91 to be shifted as indicated by a vector e4, a shift distance a3 being generated in a direction of the height of the step of the detention body 92. To cope with this, the height of the step between N–R positions is set greater than the shift distance a3 of the detent pawl 91. The detent pawl 91 is a flat plate, its area engaging the step of the detention body 92 is wide, and the pawl does not have any curved surface, and therefore no compensating means, such as those described in the first and second embodiments, needs to be provided (the height of the step is increased by a distance equal to the radius of the guide pin).

In addition, in order to prevent an erroneous gear shift when shifted from $2^{nd}$ position to R position, the step between 2–R positions may be set in the same manner as done in the second embodiment (the difference in height between the step between N–R positions and the step between D–R positions).

(Sixth Embodiment)

Figure 12:
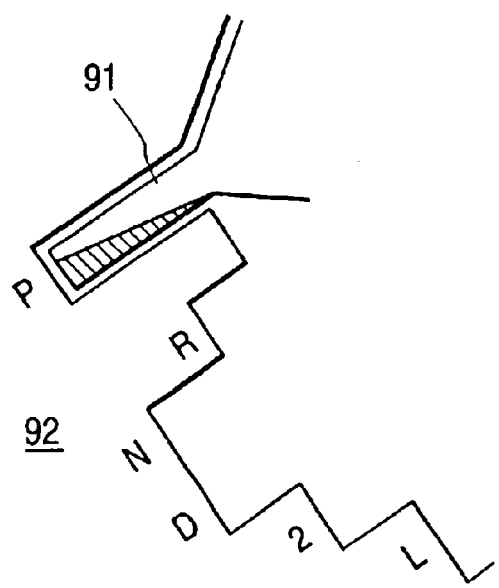
FIG. 12 is a schematic diagram for explaining a sixth embodiment.

FIG. 12 is a schematic diagram for explaining a sixth embodiment. This embodiment is needed when the gears are shifted from P position to R position. An object of this embodiment is to improve the shift feeling when the shift control lever 2 is pulled up, and the embodiment may be regarded as a modification of the third and fourth embodiments. The driver tries to operate the shift control lever toward the shoulder point. This causes the detent pawl to be caught on a sliding portion of the step between P–R positions, and a direction in which the shift control lever can be pulled up is different from a direction which makes the driver feel no feeling of physical disorder. Then, to cope with this, the detent pawl 91 is configured such that it is partially cut (a diagonally lined portion corresponds to a cut-away portion. To be specific, the portion is diagonally cut in a linear, curved or parabolic fashion. This can provide the same effectiveness as those provided by the third and fourth embodiments. The specific conditions of those configurations are substantially the same as those described in the third and fourth embodiments, and therefore, a description thereof will be omitted here. In addition, as with the third and fourth embodiments, in this embodiment, too, the step between P–R positions, D–$2^{nd}$ positions, or $2^{nd}$–L positions on the detention body 92 side may be cut. Alternatively, instead of the detent pawl side, the detention body side may be cut as described above, or both the detent pawl and detention body sides may be cut.

(Seventh Embodiment)

Figure 13:
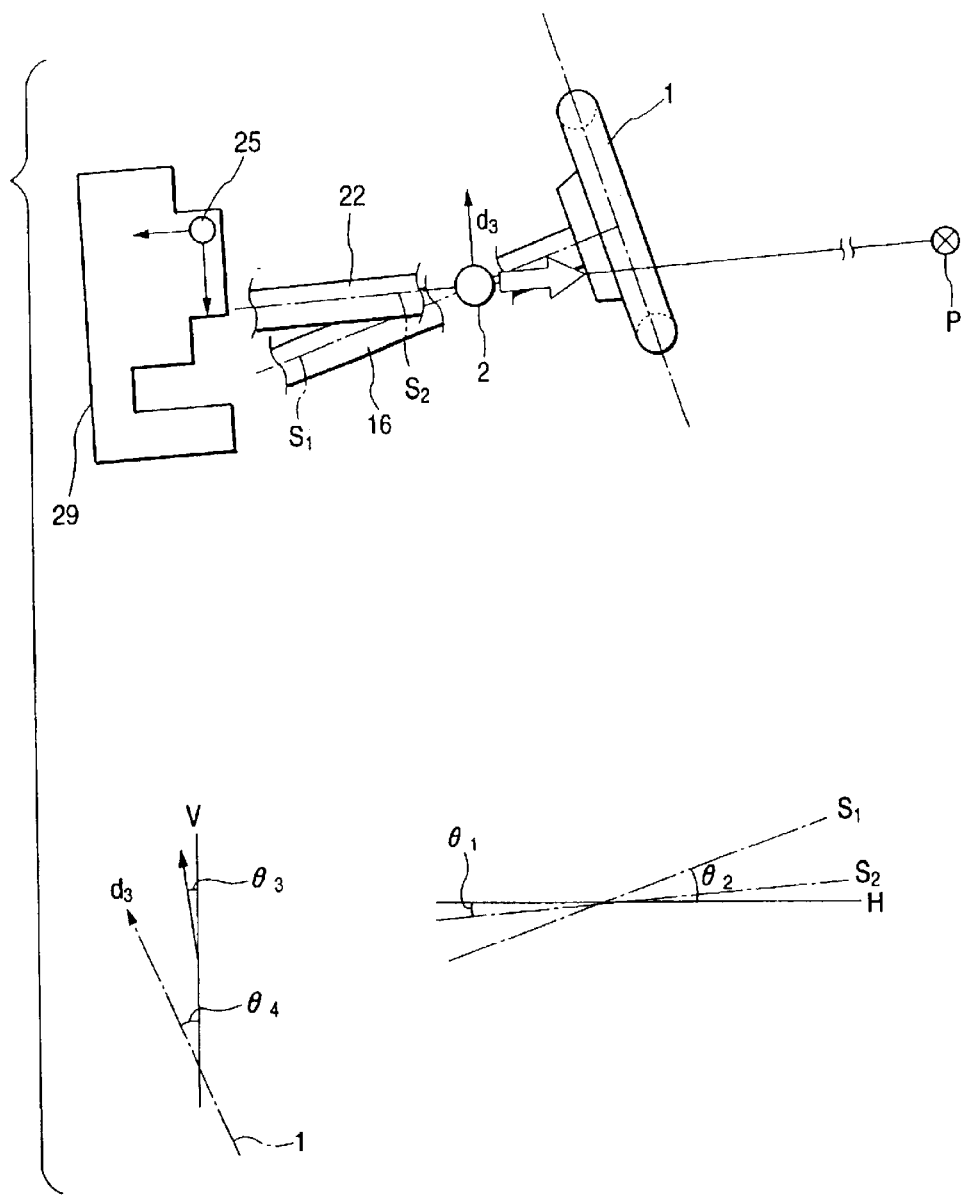
FIG. 13 is a schematic diagram for explaining a seventh embodiment.
Figure 14:
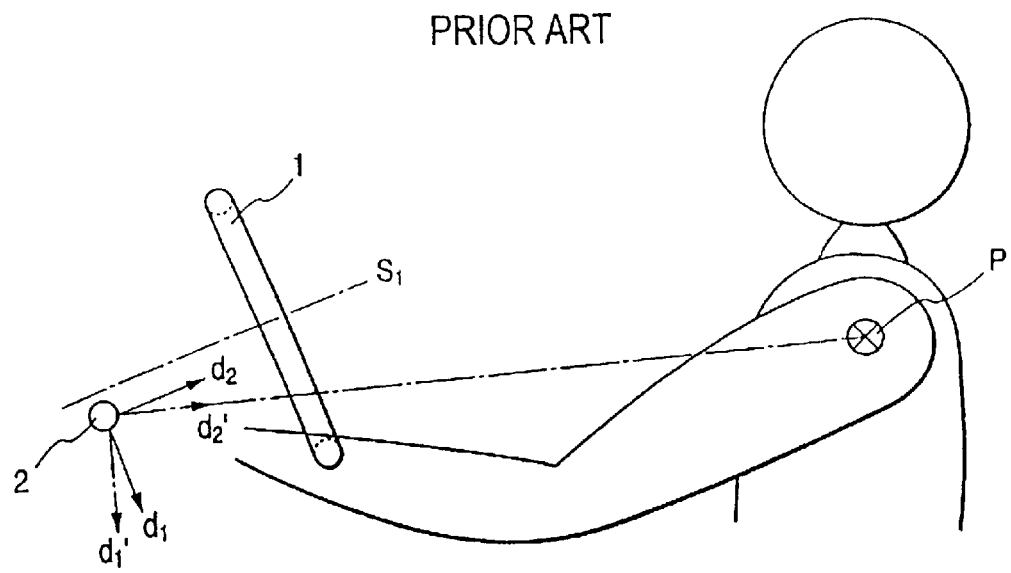
FIG. 14 is a diagram explaining a conventional column-type transmission shift control device.

FIG. 13 is a schematic diagram for explaining a seventh embodiment of a transmission mechanism shift control device. The transmission mechanism shift control device according to this embodiment is basically identical to the previously described ones in that the components shown in FIGS. 1 and 2 are used therein but is different from those in the mounting of the transmission mechanism shift control device 15 relative to the steering shaft 14. In other words, the shift shaft 22 is mounted on the transmission mechanism shift control device 15 such that the axis S2 of the shift shaft is oriented in a direction different from that of the axis S1 of the steering shaft 16. This is effected by setting the shift control device such that an angle θ1 forming an acute angle by the axial direction S2 of the shift shaft 22 and a horizontal line is smaller than an angle θ2 forming an acute angle by the axial direction S1 of the steering shaft 16 and the horizontal line. In other words, it is constructed such that an angle θ3 forming an acute angle by a swinging direction d3 of the shift control lever 2 and a vertical line V is smaller than an angle θ4 forming a smallest acute angle by a straight line on the plane of the steering wheel 1 and the vertical line V. Thus, if the transmission mechanism shift control device 15 is disposed such that a straight line L connecting the shift control lever 2 with the shoulder point P and the axis S2 of the shift shaft 22 are substantially parallel with each other, the shift control lever can be operated with the distance between the shift control lever 2 and the shoulder point P being maintained substantially constant. As a result of this, from the reason described heretofore, erroneous gear shifting can be prevented. In addition, even when the shift control lever 2 is pulled up, since the pull-up direction coincides with the axis S2 of the shift shaft 22, the driver is prevented from feeling a feeling of physical disorder or discomfort, whereby the shift feeling can further be improved.

The seventh embodiment can be combined with the first to sixth embodiments. Namely, the axial direction S2 of the shift shaft 22 is offset from the axial direction S1 of the steering shaft 16 to some extent, and the steps of the regulating member for the guide plate or the like may be configured as described in the above embodiments.

For instance, as is described in the first and second embodiments, the height of the step may be made greater than the shift distance resulting when the shift control lever is shifted to be pulled up with the distance between the lever and the shoulder point being maintained substantially constant before or after gear shifting. In addition, as described in the third and fourth embodiments, in a case where the guide pin is shifted along the sliding portion while kept in abutment therewith as a result of the shift control lever being operated so as to be pulled up, it may be constructed such that the angle forming an acute angle by the shift direction of the guide pin and the reference line is smaller than the angle forming an acute angle by the axial direction of the shift shaft and the reference line. Here, the reference line is a line connecting the position of the shift control lever with the shoulder point of the driver at his or her driving position. Thus, preferably, the shift path of the guide member in which the guide member is shifted along the sliding portion while kept in abutment therewith when the shift control lever is operated to be pulled up is substantially parallel with the reference line. Furthermore, these features may be combined with each other.

Even if the axis of the shift shaft cannot be parallel with the line connecting the shift control lever and the shoulder point due to a problem with the disposition of the transmission mechanism shift control device, the shift feeling can further be improved and the occurrence of erroneous gear shifting can further be prevented by devising the configuration of the guide plate.

Thus, according to the present invention, even when the shift control lever is operated to be swung in a direction which makes the driver feel no feeling of physical disorder, an accurate gear shift can be effected with occurrence of no erroneous gear shift. In addition, since the shift control lever can be pulled up in a direction which makes the drive feel naturally, the shift feeling can further be improved.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. The shift control device for a transmission mechanism for a motor vehicle in which gear shifting is performed by a shift control lever provided in the vicinity of a steering wheel for column shifting, comprising:
 a steering shaft movable in response to operation of said steering wheel; and
 a shift shaft rotatable in accordance with the operation of said shift control lever in a first direction and movable in an axial direction thereof in accordance with the operation of said shift control lever in a second direction which is different from said first direction,
 wherein an axial direction of said shift shaft and an axial direction of said steering shaft are offset from each other;
 a guide member movable in a third direction by swingably operating said shift control lever and movable in a fourth direction different from said third direction by pull-up operating said shift control lever; and
 a regulating member having a plurality of steps for regulating the movement of said guide member in said third direction, whereby the operating distance to pull up said shift control lever is regulated by heights of said plurality of steps, respectively,
 a regulating member having a slidable portion for regulating a direction in which said shift control lever is pulled up through an abutment with said guide member;
 wherein a travelling path of said guide member along which said guide member travels while kept in abutment with said slidable portion through the pull-up operation of said shift control lever is substantially parallel with a reference line, and
 wherein said reference line is a line connecting the position of said shift control lever and the shoulder point of the driver at a driving position of the driver.

2. The shift control device for a transmission mechanism for a motor vehicle in which gear shifting is performed by a shift control lever provided in the vicinity of a steering wheel for column shifting, comprising:
 a steering shaft movable in response to operation of said steering wheel; and
 a shift shaft rotatable in accordance with the operation of said shift control lever in a first direction and movable in an axial direction thereof in accordance with the operation of said shift control lever in a second direction which is different from said first direction,
 wherein a first acute angle formed by a line extending in the axial direction of said shift shaft and a horizontal line is smaller than a second acute angle formed by a line extending in the axial direction of said steering shaft and the horizontal line,
 a guide member movable in a third direction by swingably operating said shift control lever and movable in a fourth direction different from said third direction by pull-up operating said shift control lever; and
 a regulating member having a plurality of steps for regulating the movement of said guide member in said third direction, whereby the operating distance to pull up said shift control lever is regulated by heights of said plurality of steps, respectively,
 wherein the heights of said plurality of steps for regulating the operating distance to pull up said shift control lever at the time of gear shifting accompanied by a pull-up operation of said shift control lever are greater than a travelling distance of said guide member in said second direction when said shift control lever is caused to travel from a position before said gear shifting to a position thereafter while a distance between a position of said shift control lever before said gear shifting and a shoulder point of the driver at a driving position of the driver is being maintained substantially constant.

3. The shift control device for a transmission mechanism for a motor vehicle comprising:
 a shift control lever provided in the vicinity of a steering wheel for column shifting; and
 a shift shaft rotatable in accordance with the operation of said shift control lever in a first direction and movable in an axial direction thereof in accordance with the operation of said shift control lever in a second direction which is different from said first direction,
 wherein a line formed by connecting said shift control lever and a shoulder point of the driver at a driving position of the driver is substantially parallel with the axial direction of said shift shaft,
 a guide member movable in a third direction by swingably operating said shift control lever and movable in a fourth direction different from said third direction by pull-up operating said shift control lever; and
 a regulating member having a plurality of steps for regulating the movement of said guide member in said third direction, whereby the operating distance to pull up said shift control lever is regulated by heights of said plurality of steps, respectively,
 wherein the heights of said plurality of steps for regulating the operating distance to pull up said shift control lever at the time of gear shifting accompanied by a pull-up operation of said shift control lever are greater than a travelling distance of said guide member in said second direction when said shift control lever is caused to travel from a position before said gear shifting to a position thereafter while a distance between a position of said shift control lever before said gear shifting and a shoulder point of the driver at a driving position of the driver is being maintained substantially constant.

4. The shift control device for a transmission mechanism for a motor vehicle comprising:
 a shift shaft rotatable and movable in an axial direction thereof; and
 a shift control lever for column shifting provided in the vicinity of a steering wheel for being kept in engagement with said shift shaft, and adapted to rotate said shift shaft when moved in a first direction and move said shift shaft in said axial direction when moved in a second direction which is different from said first direction,
 wherein a first acute angle formed by a line extending said first direction of said shift control lever and a vertical line is smaller than a second acute angle formed by a straight line of a plane of said steering wheel and the vertical line,
 a guide member movable in a third direction by swingably operating said shift control lever and movable in a fourth direction different from said third direction by pull-up operating said shift control lever; and
 a regulating member having a plurality of steps for regulating the movement of said guide member in said third direction, whereby the operating distance to pull up said shift control lever is regulated by heights of said plurality of steps, respectively, wherein the heights of said plurality of steps for regulating the operating distance to pull up said shift control lever at the time of gear shifting accompanied by a pull-up operation of said shift control lever are greater than a travelling distance of said guide member in said second direction when said shift control lever is caused to travel from a position before said gear shifting to a position thereafter while a distance between a position of said shift control lever before said gear shifting and a shoulder point of the driver at a driving position of the driver is being maintained substantially constant.

5. The shift control device for a transmission mechanism for a motor vehicle comprising:
a steering wheel;
a steering shaft movable in response to operation of said steering wheel;
a shift shaft rotatable and movable in an axial direction thereof; and
a shift control lever for column shifting provided in the vicinity of a steering wheel, kept in engagement with said shift shaft, and adapted to rotate said shift shaft when moved in a first direction and move said shift shaft in said axial direction when moved in a second direction which is different from said first direction,
wherein a first acute angle formed by a line extending in a said second direction of said shift control lever and a horizontal line is smaller than a second acute angle formed by a line extending the axial direction of said steering shaft and said horizontal line,
a guide member movable in a third direction by swingably operating said shift control lever and movable in a fourth direction different from said third direction by pull-up operating said shift control lever; and
a regulating member having a plurality of steps for regulating the movement of said guide member in said third direction, whereby the operating distance to pull up said shift control lever is regulated by heights of said plurality of steps, respectively,
wherein the heights of said plurality of steps for regulating the operating distance to pull up said shift control lever at the time of gear shifting accompanied by a pull-up operation of said shift control lever are greater than a travelling distance of said guide member in said second direction when said shift control lever is caused to travel from a position before said gear shifting to a position thereafter while a distance between a position of said shift control lever before said gear shifting and a shoulder point of the driver at a driving position of the driver is being maintained substantially constant.

6. The shift control device for a transmission mechanism for a motor vehicle
in which gear shifting is performed by a shift control lever provided in the vicinity of a steering wheel for column shifting, comprising:
a steering shaft movable in response to operation of said steering wheel; and
a shift shaft rotatable in accordance with the operation of said shift control lever in a first direction and movable in an axial direction thereof in accordance with the operation of said shift control lever in a second direction which is different from said first direction,
wherein an axial direction of said shift shaft and an axial direction of said steering shaft are offset from each other;
a guide member movable in a third direction by swingably operating said shift control lever and in a fourth direction different from said third direction by pull-up operating said shift control lever; and
a regulating member having a slideable portion for regulating a direction in which said shift control lever is pulled up through an abutment with said guide member;
wherein a third acute angle formed by a reference line and a line extending in a travelling direction of said guide member in which said guide member travels while being kept in abutment with said slidable portion through the pull-up operation of said shift control lever is smaller than a fourth acute angle defined by said reference line and a line extending in an axial direction of said shift shaft, where said reference line is a line formed by connecting the position of said shift control lever and the shoulder point of the driver at a driving position of the driver.

7. The shift control device for a transmission mechanism for a motor vehicle
in which gear shifting is performed by a shift control lever provided in the vicinity of a steering wheel for column shifting, comprising:
a steering shaft movable in response to operation of said steering wheel; and
a shift shaft rotatable in accordance with the operation of said shift control lever in a first direction and movable in an axial direction thereof in accordance with the operation of said shift control lever in a second direction which is different from said first direction,
wherein a first acute angle formed by a line extending in the axial direction of said shift shaft and a horizontal line is smaller than a second acute angle formed by a line extending in the axial direction of said steering shaft and the horizontal line,
a guide member movable in a third direction by swingably operating said shift control lever and in a fourth direction different from said third direction by pull-up operating said shift control lever; and
a regulating member having a slideable portion for regulating a direction in which said shift control lever is pulled up through an abutment with said guide member;
wherein a third acute angle formed by a reference line and a line extending in a travelling direction of said guide member in which said guide member travels while being kept in abutment with said slidable portion through the pull-up operation of said shift control lever is smaller than a fourth acute angle defined by said reference line and a line extending in an axial direction of said shift shaft, where said reference line is a line formed by connecting the position of said shift control lever and the shoulder point of the driver at a driving position of the driver.

8. The shift control device for a transmission mechanism for a motor vehicle comprising:
a shift control lever provided in the vicinity of a steering wheel for column shifting; and
a shift shaft rotatable in accordance with the operation of said shift control lever in a first direction and movable in an axial direction thereof in accordance with the operation of said shift control lever in a second direction which is different from said first direction,
wherein a line formed by connecting said shift control lever and a shoulder point of the driver at a driving position of the driver is substantially parallel with the axial direction of said shift shaft, a guide member movable in a third direction by swingably operating said shift control lever and in a fourth direction different from said third direction by pull-up operating said shift control lever; and a regulating member having a slideable portion for regulating a direction in which said shift control lever is pulled up through an abutment with said guide member;

wherein a third acute angle formed by a reference line and a line extending in a travelling direction of said guide member in which said guide member travels while being kept in abutment with said slidable portion through the pull-up operation of said shift control lever is smaller than a fourth acute angle defined by said reference line and a line extending in an axial direction of said shift shaft, where said reference line is a line formed by connecting the position of said shift control lever and the shoulder point of the driver at a driving position of the driver.

9. The shift control device for a transmission mechanism for a motor vehicle comprising:

a shift shaft rotatable and movable in an axial direction thereof; and a shift control lever for column shifting provided in the vicinity of a steering wheel for being kept in engagement with said shift shaft, and adapted to rotate said shift shall when moved in a first direction and move said shift shaft in said axial direction when moved in a second direction which is different from said first direction, wherein a first acute angle formed by a line extending said first direction of said shift control lever and a vertical line is smaller than a second acute angle formed by a straight line of a plane of said steering wheel and the vertical line, a guide member movable in a third direction by swingably operating said shift control lever and in a fourth direction different from said third direction by pull-up operating said shift control lever; and a regulating member having a slideable portion for regulating a direction in which said shift control lever is pulled up through an abutment with said guide member;

wherein a third acute angle formed by a reference line and a line extending in a travelling direction of said guide member in which said guide member travels while being kept in abutment with said slidable portion through the pull-up operation of said shift control lever is smaller than a fourth acute angle defined by said reference line and a line extending in an axial direction of said shift shaft, where said reference line is a line formed by connecting the position of said shift control lever and the shoulder point of the driver at a driving position of the driver.

10. The shift control device for a transmission mechanism for a motor vehicle comprising:

a steering wheel;

a steering shaft movable in response to operation of said steering wheel;

a shift shaft rotatable and movable in an axial direction thereof; and a shift control lever for column shifting provided in the vicinity of a steering wheel, kept in engagement with said shift shaft, and adapted to rotate said shift shaft when moved in a first direction and move said shift shaft in said axial direction when moved in a second direction which is different from said first direction, wherein a first acute angle formed by a line extending in a said second direction of said shift control lever and a horizontal line is smaller than a second acute angle formed by a line extending the axial direction of said steering shaft and said horizontal line, a guide member movable in a third direction by swingably operating said shift control lever and in a fourth direction different from said third direction by pull-up operating said shift control lever; and a regulating member having a slideable portion for regulating a direction in which said shift control lever is pulled up through an abutment with said guide member;

wherein a third acute angle formed by a reference line and a line extending in a travelling direction of said guide member in which said guide member travels while being kept in abutment with said slidable portion through the pull-up operation of said shift control lever is smaller than a fourth acute angle defined by said reference line and a line extending in an axial direction of said shift shaft, where said reference line is a line formed by connecting the position of said shift control lever and the shoulder point of the driver at a driving position of the driver.

11. A shift control device for a transmission mechanism for a motor vehicle in which gear shifting is performed by a shift control lever provided in the vicinity of a steering wheel for column shifting, comprising:

a steering shaft movable in response to operation of said steering wheel; and a shift shaft rotatable in accordance with the operation of said shift control lever in a first direction and movable in an axial direction thereof in accordance with the operation of said shift control lever in a second direction which is different from said first direction, wherein an axial direction of said shift shaft and an axial direction of said steering shaft are offset from each other;

a guide member movable in a third direction by swingably operating said shift control lever and moving in a fourth direction different from said third direction by pull-up operating said shift control lever; and a regulating member having a slidable portion for regulating a direction in which said shift control lever is pulled up through an abutment with said guide member;

wherein a travelling path of said guide member along which said guide member travels while kept in abutment with said slidable portion through the pull-up operation of said shift control lever is substantially parallel with a reference line, and wherein said reference line is a line connecting the position of said shift control lever and the shoulder point of the driver at a driving position of the driver.

12. A shift control device for a transmission mechanism for a motor vehicle in which gear shifting is performed by a shift control lever provided in the vicinity of a steering wheel for column shifting, comprising:

a steering shaft movable in response to operation of said steering wheel; and a shift shaft rotatable in accordance with the operation of said shift control lever in a first direction and movable in an axial direction thereof in accordance with the operation of said shift control lever in a second direction which is different from said first direction, wherein a first acute angle formed by a line extending in the axial direction of said shift shaft and a horizontal line is smaller than a second acute angle formed by a line extending in the axial direction of said steering shaft and the horizontal line, a guide member movable in a third direction by swingably operating said shift control lever and moving in a fourth direction different from said third direction by pull-up operating said shift control lever; and a regulating member having a slidable portion for regulating a direction in which said shift control lever is pulled up through an abutment with said guide member;

wherein a travelling path of said guide member along which said guide member travels while kept in abutment with said slidable portion through the pull-up operation of said shift control lever is substantially parallel with a reference line, and wherein said reference line is a line connecting the position of said shift control lever and the shoulder point of the driver at a driving position of the driver.

13. A shift control device for a transmission mechanism for a motor vehicle a shift control lever provided in the vicinity of a steering wheel for column shifting; and a shift shaft rotatable in accordance with the operation of said shift control lever in a first direction and movable in an axial direction thereof in accordance with the operation of said shift control lever in a second direction which is different from said first direction, wherein a line formed by connecting said shift control lever and a shoulder point of the driver at a driving position of the driver is substantially parallel with the axial direction of said shift shaft, a guide member movable in a third direction by swingably operating said shift control lever and moving in a fourth direction different from said third direction by pull-up operating said shift control lever; and a regulating member having a slidable portion for regulating a direction in which said shift control lever is pulled up through an abutment with said guide member;

wherein a travelling path of said guide member along which said guide member travels while kept in abutment with said slidable portion through the pull-up operation of said shift control lever is substantially parallel with a reference line, and wherein said reference line is a line connecting the position of said shift control lever and the shoulder point of the driver at a driving position of the driver.

14. A shift control device for a transmission mechanism for a motor vehicle comprising:

a shift shaft rotatable and movable in an axial direction thereof; and a shift control lever for column shifting provided in the vicinity of a steering wheel for being kept in engagement with said shift shaft, and adapted to rotate said shift shaft when moved in a first direction and move said shift shaft in said axial direction when moved in a second direction which is different from said first direction, wherein a first acute angle formed by a line extending said first direction of said shift control lever and a vertical line is smaller than a second acute angle formed by a straight line of a plane of said steering wheel and the vertical line, a guide member movable in a third direction by swingably operating said shift control lever and moving in a fourth direction different from said third direction by pull-up operating said shift control lever; and wherein the heights of said plurality of steps for regulating the operating distance to pull up said shift control lever at the time of gear shifting accompanied by a pull-up operation of said shift control lever are greater than a travelling distance of said guide member in said second direction when said shift control lever is caused to travel from a position before said gear shifting to a position thereafter while a distance between a position of said shift control lever before said gear shifting and a shoulder point of the driver at a driving position of the driver is being maintained substantially constant.

15. A shift control device for a transmission mechanism for a motor vehicle comprising:

a steering wheel;

a steering shaft movable in response to operation of said steering wheel;

a shift shaft rotatable and movable in an axial direction thereof; and a shift control lever for column shifting provided in the vicinity of a steering wheel, kept in engagement with said shift shaft, and adapted to rotate said shift shaft when moved in a first direction and move said shift shaft in said axial direction when moved in a second direction which is different from said first direction, wherein a first acute angle formed by a line extending in a said second direction of said shift control lever and a horizontal line is smaller than a second acute angle formed by a line extending the axial direction of said steering shaft and said horizontal line, a guide member movable in a third direction by swingably operating said shift control lever and moving in a fourth direction different from said third direction by pull-up operating said shift control lever; and a regulating member having a slidable portion for regulating a direction in which said shift control lever is pulled up through an abutment with said guide member;

wherein a travelling path of said guide member along which said guide member travels while kept in abutment with said slidable portion through the pull-up operation of said shift control lever is substantially parallel with a reference line, and wherein said reference line is a line connecting the position of said shift control lever and the shoulder point of the driver at a driving position of the driver.

16. The shift control device for a transmission mechanism for a motor vehicle in which gear shifting is performed by a shift control lever provided in the vicinity of a steering wheel for column shifting, comprising:

a steering shaft movable in response to operation of said steering wheel; and a shift shaft rotatable in accordance with the operation of said shift control lever in a first direction and movable in an axial direction thereof in accordance with the operation of said shift control lever in a second direction which is different from said first direction, wherein an axial direction of said shift shaft and an axial direction of said steering shaft are offset from each other;

a guide member movable in a third direction by swingably operating said shift control lever and movable in a fourth direction different from said third direction by pull-up operating said shift control lever; and a regulating member having a plurality of steps for regulating the movement of said guide member in said third direction, whereby the operating distance to pull up said shift control lever is regulated by heights of said plurality of steps, respectively and a slidable portion for regulating a direction in which said shift control lever is pulled up through an abutment with said guide member, wherein the heights of said plurality of steps for regulating the operating distance to pull up said shift control lever at the time of gear shifting accompanied by a pull-up operation of said shift control lever are greater than a travelling distance of said guide member in said second direction when said shift control lever is caused to travel from a position before said gear shifting to a position thereafter while a distance between a position of said shift control lever before said gear shifting and a shoulder point of the driver at a driving position of the driver is being maintained substantially constant, and wherein a third acute angle formed by a reference line and a line extending in a travelling direction of said guide member in which said guide member travels while being kept in abutment with said slidable portion through the pull-up operation of said shift control lever is smaller than a fourth acute angle defined by said reference line and a line extending in an axial direction of said shift shaft, where said reference line is a line formed by connecting the position of said shift control lever and the shoulder point of the driver at a driving position of the driver.

17. The shift control device for a transmission mechanism for a motor vehicle in which gear shifting is performed by a shift control lever provided in the vicinity of a steering wheel for column shifting, comprising:

a steering shaft movable in response to operation of said steering wheel; and a shift shaft rotatable in accordance with the operation of said shift control lever in a first direction and movable in an axial direction thereof in accordance with the operation of said shift control lever in a second direction which is different from said first direction, wherein a first acute angle formed by a line extending in the axial direction of said shift shaft and a horizontal line is smaller than a second acute angle formed by a line extending in the axial direction of said steering shaft and the horizontal line, a guide member movable in a third direction by swingably operating said shift control lever and movable in a fourth direction different from said third direction by pull-up operating said shift control lever; and a regulating member having a plurality of steps for regulating the movement of said guide member in said third direction, whereby the operating distance to pull up said shift control lever is regulated by heights of said plurality of steps, respectively and a slidable portion for regulating a direction in which said shift control lever is pulled up through an abutment with said guide member, wherein the heights of said plurality of steps for regulating the operating distance to pull up said shift control lever at the time of gear shifting accompanied by a pull-up operation of said shift control lever are greater than a travelling distance of said guide member in said second direction when said shift control lever is caused to travel from a position before said gear shifting to a position thereafter while a distance between a position of said shift control lever before said gear shifting and a shoulder point of the driver at a driving position of the driver is being maintained substantially constant, and wherein a third acute angle formed by a reference line and a line extending in a travelling direction of said guide member in which said guide member travels while being kept in abutment with said slidable portion through the pull-up operation of said shift control lever is smaller than a fourth acute angle defined by said reference line and a line extending in an axial direction of said shift shaft, where said reference line is a line formed by connecting the position of said shift control lever and the shoulder point of the driver at a driving position of the driver.

18. The shift control device for a transmission mechanism for a motor vehicle comprising:

a shift control lever provided in the vicinity of a steering wheel for column shifting; and a shift shaft rotatable in accordance with the operation of said shift control lever in a first direction and movable in an axial direction thereof in accordance with the operation of said shift control lever in a second direction which is different from said first direction, wherein a line formed by connecting said shift control lever and a shoulder point of the driver at a driving position of the driver is substantially parallel with the axial direction of said shift shaft, a guide member movable in a third direction by swingably operating said shift control lever and movable in a fourth direction different from said third direction by pull-up operating said shift control lever; and a regulating member having a plurality of steps for regulating the movement of said guide member in said third direction, whereby the operating distance to pull up said shift control lever is regulated by heights of said plurality of steps, respectively and a slidable portion for regulating a direction in which said shift control lever is pulled up through an abutment with said guide member, wherein the heights of said plurality of steps for regulating the operating distance to pull up said shift control lever at the time of gear shifting accompanied by a pull-up operation of said shift control lever are greater than a travelling distance of said guide member in said second direction when said shift control lever is caused to travel from a position before said gear shifting to a position thereafter while a distance between a position of said shift control lever before said gear shifting and a shoulder point of the driver at a driving position of the driver is being maintained substantially constant, and wherein a third acute angle formed by a reference line and a line extending in a travelling direction of said guide member in which said guide member travels while being kept in abutment with said slidable portion through the pull-up operation of said shift control lever is smaller than a fourth acute angle defined by said reference line and a line extending in an axial direction of said shift shaft, where said reference line is a line formed by connecting the position of said shift control lever and the shoulder point of the driver at a driving position of the driver.

19. The shift control device for a transmission mechanism for a motor vehicle comprising:
- a shift shaft rotatable and movable in an axial direction thereof; and
- a shift control lever for column shifting provided in the vicinity of a steering wheel for being kept in engagement with said shift shaft, and adapted to rotate said shift shaft when moved in a first direction and move said shift shaft in said axial direction when moved in a second direction which is different from said first direction,
- wherein a first acute angle formed by a line extending said first direction of said shift control lever and a vertical line is smaller than a second acute angle formed by a straight line of a plane of said steering wheel and the vertical line,
- a guide member movable in a third direction by swingably operating said shift control lever and movable in a fourth direction different from said third direction by pull-up operating said shift control lever; and
- a regulating member having a plurality of steps for regulating the movement of said guide member in said third direction, whereby the operating distance to pull up said shift control lever is regulated by heights of said plurality of steps, respectively and a slidable portion for regulating a direction in which said shift control lever is pulled up through an abutment with said guide member,
- wherein the heights of said plurality of steps for regulating the operating distance to pull up said shift control lever at the time of gear shifting accompanied by a pull-up operation of said shift control lever are greater than a travelling distance of said guide member in said second direction when said shift control lever is caused to travel from a position before said gear shifting to a position thereafter while a distance between a position of said shift control lever before said gear shifting and a shoulder point of the driver at a driving position of the driver is being maintained substantially constant, and
- wherein a third acute angle formed by a reference line and a line extending in a travelling direction of said guide member in which said guide member travels while being kept in abutment with said slidable portion through the pull-up operation of said shift control lever is smaller than a fourth acute angle defined by said reference line and a line extending in an axial direction of said shift shaft, where said reference line is a line formed by connecting the position of said shift control lever and the shoulder point of the driver at a driving position of the driver.

20. A shift control device for a transmission mechanism for a motor vehicle comprising:
- a steering wheel;
- a steering shaft movable in response to operation of said steering wheel;
- a shift shaft rotatable and movable in an axial direction thereof; and
- a shift control lever for column shifting provided in the vicinity of a steering wheel, kept in engagement with said shift shaft, and adapted to rotate said shift shaft when moved in a first direction and move said shift shaft in said axial direction when moved in a second direction which is different from said first direction,
- wherein a first acute angle formed by a line extending in a said second direction of said shift control lever and a horizontal line is smaller than a second acute angle formed by a line extending the axial direction of said steering shaft and said horizontal line,
- a guide member movable in a third direction by swingably operating said shift control lever and movable in a fourth direction different from said third direction by pull-up operating said shift control lever; and
- a regulating member having a plurality of steps for regulating the movement of said guide member in said third direction, whereby the operating distance to pull up said shift control lever is regulated by heights of said plurality of steps, respectively and a slidable portion for regulating a direction in which said shift control lever is pulled up through an abutment with said guide member,
- wherein the heights of said plurality of steps for regulating the operating distance to pull up said shift control lever at the time of gear shifting accompanied by a pull-up operation of said shift control lever are greater than a travelling distance of said guide member in said second direction when said shift control lever is caused to travel from a position before said gear shifting to a position thereafter while a distance between a position of said shift control lever before said gear shifting and a shoulder point of the driver at a driving position of the driver is being maintained substantially constant, and
- wherein a third acute angle formed by a reference line and a line extending in a travelling direction of said guide member in which said guide member travels while being kept in abutment with said slidable portion through the pull-up operation of said shift control lever is smaller than a fourth acute angle defined by said reference line and a line extending in an axial direction of said shift shaft, where said reference line is a line formed by connecting the position of said shift control lever and the shoulder point of the driver at a driving position of the driver.

* * * * *